United States Patent [19]
Choi

[11] Patent Number: 5,888,571
[45] Date of Patent: Mar. 30, 1999

[54] PROCESS FOR PREPARING A GINKGO LEAF TEA

[76] Inventor: Seung Chang Choi, 1119-1403 Mokdong Apartment, Shinjung-Dong 325, Yang Chung-Gu, Seoul, Rep. of Korea

[21] Appl. No.: 897,604

[22] Filed: Jul. 21, 1997

[30] Foreign Application Priority Data

Jul. 30, 1996 [KR] Rep. of Korea ............................ 31419

[51] Int. Cl.$^6$ ................................ A23L 1/20; A23F 3/34; A23F 3/00
[52] U.S. Cl. ........................... 426/431; 426/435; 426/597
[58] Field of Search ..................................... 426/597, 590, 426/435, 431

[56] References Cited

U.S. PATENT DOCUMENTS

| | | | |
|---|---|---|---|
| 4,683,140 | 7/1987 | Kang | 426/597 |
| 4,956,429 | 9/1990 | Harmetz et al. | 426/271 |
| 5,578,338 | 11/1996 | Shimabukuro | 426/597 |

OTHER PUBLICATIONS

Peter et al, 16:719–725, 1966. Zur Pharmakologie dev Wirkstoffe aus Ginko biloba.

T. Kosuge, et al. vol. 83, pp. 422–423, 1963. An Antimicrobial Substance Isolated from *Ligularia tussiloginea* Makino.

*Primary Examiner*—Anthony J. Weier
*Attorney, Agent, or Firm*—Foley & Lardner

[57] ABSTRACT

A process for preparing a ginkgo leaf powder tea from which 2-hexenal has been eliminated, and whose taste has been improved, having the steps of selecting and washing fresh ginkgo leaves, roasting the leaves in a roaster whose internal temperature is controlled in the range of 160° to 180° C. for 10 to 15 minutes, rolling the roasted ginkgo leaves in a roller for 15 to 20 minutes, and heat-drying the rolled leaves by purging nitrogen gas of 90° to 100° C. for 30 to 40 minutes, shredding and pulverizing the dried ginkgo leaves to produce ginkgo leaf powder of 100 to 400 mesh, roasting the ginkgo leaf powder thus produced by rotating the powder at a temperature of between 80° to 85° C. for 2 to 3 hours, and, removing powder particles greater than 400 mesh from the ginkgo leaf powder by blowing air or fanning, and packaging the ginkgo leaf powder into teabags or other desired packaging.

17 Claims, No Drawings

PROCESS FOR PREPARING A GINKGO LEAF TEA

BACKGROUND OF THE INVENTION

1. Field of the Invention

The present invention relates to a process for preparing a ginkgo leaf tea and, more specifically, relates to a process for preparing a ginkgo leaf powder tea from which 2-hexenal has been eliminated and whose palate has been improved.

2. Description of Related Art

It is well known that a ginkgo tree contains many physiologically active components. For example, a ginkgo nut contains phenolic compounds, ginkgo, ginkgolic acid, etc., while a ginkgo leaf contains various aromatic compounds including phenolic compounds, flavonoid glycosides, simple flavonoids such as kaempferol, quercetin, isoramnetin and luotelin, and terpenoid compounds such as ginkolides.

Since the discovery that ginkgo leaf extract facilitates blood circulation in guinea pigs (see: Arzneimittel Forschung, 16:719(1966)), studies on ginkgo leaves have been extensively carried out in the art. In addition, ginkgo leaf extract is commercially available as a medicament in many countries. Ginkgo leaf extract has been reported to be highly effective for treating Burger's disease, diseases caused by disorders in peripheral blood circulation, astigmatism, bradyacusia, disorders in physical coordination, and coldness of limbs in aged people, cerebral infarction caused by disorders of blood circulation in brain, dementia, limb paralysis, etc.

As illustrated above, ginkgo leaves, which have many beneficial components for the human body, are being actively studied as possible active ingredients in medicine. However, heretofore, ginkgo leaves have not been manufactured as foodstuff additives from which the above-described beneficial components can be utilized. In particular, the use of ginkgo leaves as foodstuff additives has been proven to be less than satisfactory because, inter alia, ginkgo leaves have a bitter taste and a flavor that many people find objectionable. In addition, ginkgo leaves include a toxic 2-hexenal component which, however, is also known to be an anti-bacterial and anti-viral material. Thus, for at least these reasons, there have been obstacles in utilizing ginkgo leaves as raw materials for foodstuffs (see: T. Kosuge and N. Yokota, Yakuyaku Zasshi, 83:422(1963)). Accordingly, there exists a need for exploring and developing a novel process for the preparation of ginkgo leaves with an improved palate and safety, to solve the problems existing in the art.

SUMMARY OF THE INVENTION

In accordance with the present invention, there is provided a process for preparing a ginkgo leaf powder tea, wherein 2-hexenal, the objectionable flavor, and the bitter taste of ginkgo leaves are completely eliminated, thus enabling people to easily obtain the beneficial components in ginkgo leaves.

An object of the present invention is, therefore, to provide a process of preparing a ginkgo leaf powder tea with an improved palate and safety.

Another object of the present invention is to provide a ginkgo leaf powder tea prepared by the process.

In accordance with these and other objectives there is provided a process for preparing a ginkgo leaf powder tea which comprises the steps of:

(i) selecting and washing fresh ginkgo leaves, and roasting them in a roaster whose internal temperature is controlled in the range of between about 160° to 180° C. for about 10 to 15 minutes;

(ii) rolling the roasted ginkgo leaves in a roller for about 15 to 20 minutes, and thereafter heat-drying them by purging with nitrogen gas at a temperature of between about 90° to 100° C. for about 30 to 40 minutes;

(iii) shredding and pulverizing the dried ginkgo leaves to produce ginkgo leaf powder of between about 100 to 400 mesh;

(iv) roasting the ginkgo leaf powder at between about 80° to 85° C. for about 2 to 3 hours; and, (v) removing fine powder particles over about 400 mesh from the ginkgo leaf powder.

The remaining ginkgo leaf powder maybe packaged into teabags or other types of packaging.

In further accordance with the present invention, there is provided a ginkgo leaf powder tea prepared according to a novel process.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

DETAILED DESCRIPTION OF A PREFERRED EMBODIMENTS

The ginkgo leaf powder tea of this invention is prepared by selecting and washing fresh ginkgo leaves, fermenting the ginkgo leaves or omitting the fermentation step, then subjecting them to primary roasting, rolling and heat-drying the roasted ginkgo leaves, then shredding and pulverizing the dried ginkgo leaves to produce ginkgo leaf powder, roasting the ginkgo leaf powder thus produced, removing fine powder particles over about 400 mesh from the ginkgo leaf powder. Fine powder particles over about 400 mesh may be removed by fanning. The ginkgo leaf powder may then be packaged into teabags or other desired packaging. The present invention provides a process for preparing a ginkgo leaf powder tea with an improved palate and safety, by eliminating 2-hexenal, off-flavor and bitter taste from ginkgo leaves.

2-hexenal is formed by a reaction between ginkgo leaves and oxygen and is destroyed at high temperatures. Thus, 2-hexenal can be decomposed by roasting ginkgo leaves at a high temperature and purging with nitrogen gas at a temperature of between about 90°–100° C. to eliminate oxygen in accordance with the present process. In addition, the objectionable-flavor and bitter taste of ginkgo leaf can be eliminated by roasting and drying ginkgo leaves at a high temperature.

A stepwise process for preparing a ginkgo leaf powder tea in accordance with a preferred embodiment of the present invention is described below in more detail.

(1) Fermented Ginkgo leaf powder tea

Step I: Selection of Raw Material

Rotten leaves, branches, and foreign material are completely removed, and preferably only fresh ginkgo leaves are selected and washed.

Step II: Fermentation

The ginkgo leaves selected in Step I are subjected to a fermentor whose temperature is controlled in the range of between about 40° to 50° C. Fermentation is carried out by preferably supplying warm air to the fermentor for about 60 to 90 minutes.

Step III: Primary Roasting

The fermented ginkgo leaves obtained in Step II are preferably put into a roaster whose internal temperature is maintained between about 160° to 180° C., and roasted for about 10 to 15 minutes. The roaster agitates the leaves, e.g., by rotation, to provide even roasting. In this step, 2-hexenal is decomposed and eliminated, and enzymes are inactivated to cease the process of fermentation. As a result, the green color of ginkgo leaves is preferably maintained, and the texture of the leaves is preferably softened, which eases the subsequent rolling process.

Step IV: Rolling and Heating

The ginkgo leaves thus roasted are preferably rolled in a roller for about 15 to 20 minutes. In the course of rolling, the tissues of the ginkgo leaves which have been softened in the previous steps are destroyed or fragmented, thereby easing the extraction of aroma and taste from the leaves. Then, the ginkgo leaves are preferably transferred into a tank, and preferably heat-dried by purging nitrogen gas at a temperature preferably from about between 90° to 100° C. for about 30 to 40 minutes.

Step V: Shredding and Pulverization

The dried leaves are then preferably put into a shredder, and shredding and pulverization are carried out in a repetitive manner, so as to prepare ginkgo leaf powder of preferably between about 100 to 400 mesh. Then, any residual hard parts and cladophylle of the leaves remaining unpulverized are preferably removed.

Step VI: Secondary Roasting

The ginkgo leaf powder obtained in Step V is preferably placed into a roaster, and roasted for about 2 to 3 hours. Preferably, the ginkgo leaf powder is agitated by, for example, rotation of an inner drum of the roaster, at a temperature of between about 80° to 85° C. In the course of roasting, 2-hexenal is completely decomposed and eliminated. At the same time, the objectionable-flavor and bitter aftertaste are removed so that the aroma and taste of the ginkgo leaf powder tea is improved. Moreover, the storage properties of the tea are also improved and enhanced due to the fact that the moisture in the product has been decreased by the roasting by up to 3% based on the weight of the tea powder.

Step VII: Fanning and Packing

From the ginkgo leaf powder obtained in Step VI, fine powder particles having a particle size more than about 400 mesh which may leak out of a teabag are preferably removed by air movement, e.g., fanning. The resulted ginkgo leaf powder may be packaged into teabags or other desired packaging. The resulting fermented tea is substantially free from 2-hexenal.

(2) Non-fermented Ginkgo leaf powder tea

A non-fermented ginkgo leaf powder tea can be prepared in the same manner as above, with the only exception that the second step (fermentation) is eliminated.

The present invention is further illustrated in the following examples, which should not be taken to limit the scope of the invention.

EXAMPLE 1

Preparation of a fermented ginkgo leaf powder tea 1 kg of fresh ginkgo leaves which were free from rotten leaves, branches, and foreign materials were selected and washed, and kept in a fermentor at a temperature of 40° C. under a supply of warm air to the fermentor for 90 minutes. The fermented ginkgo leaves were then placed into a roaster whose internal temperature was maintained at 180° C., and roasted for 15 minutes while rotating the inner part of the roaster. After the roasting, the ginkgo leaves were rolled in a roller for 20 minutes, transferred into a tank and heat-dried by purging nitrogen gas of 100° C. for 35 minutes to eliminate oxygen. The dried leaves were then put into a shredder, and shredding and pulverization were repeated to prepare ginkgo leaf powder of about 100 to 400 mesh. Then, the hard parts and/or cladophylle of the leaves remaining unpulverized were removed, and the ginkgo leaf powder thus prepared was put into a roaster and roasted for 3 hours while rotating an inner part of the roaster slowly at the temperature of 80° C. From the ginkgo leaf powder, fine powder particles over 400 mesh which may leak out of the teabag were removed by fanning. Then the resulted ginkgo leaf powder was packaged into teabags to prepare approximately 180 g of fermented ginkgo leaf powder tea.

EXAMPLE 2

Preparation of a non-fermented ginkgo leaf powder tea

A non-fermented ginkgo leaf powder tea was prepared in a method analogous to the preparation of fermented tea, with the only exception that the leaves were not fermented.

Tasting of Ginkgo leaf powder tea

To the ginkgo leaf powder teas prepared in Examples 1 and 2 respectively, 30 adult males and females were asked to conduct a taste test of the ginkgo leaf powder teas. The results are represented in Table 1 below.

TABLE 1

The results of taste tests conducted for ginkgo leaf powder teas (*)

|  | objectionable-flavor | Bitter Taste |
| --- | --- | --- |
| Example 1 | 8.9 | 8.7 |
| Example 2 | 8.5 | 8.4 |

* 10: completely removed
5: somewhat removed
0: not removed at all

As can be seen in Table 1, it was demonstrated that the objectionable-flavor and bitter taste were effectively eliminated from both the fermented ginkgo leaf powder tea and the non-fermented ginkgo leaf powder tea prepared by the invention.

As clearly illustrated and demonstrated as above, the present invention provides a process for preparing a ginkgo leaf powder tea with an improved taste and improved safety, by eliminating 2-hexenal, the objectionable-flavor and the bitter taste of ginkgo leaves.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The priority document, Korean Application No. 31491, filed Jul. 30, 1996, is hereby incorporated in its entirety by reference.

What is claimed is:

1. A process for preparing a ginkgo leaf powder tea comprising:

A. roasting fresh gingko leaves;

B. rolling the roasted gingko leaves;

C. heat-drying the rolled gingko leaves in a nitrogen atmosphere;

D. shredding and pulverizing the dried gingko leaves to a powder; and

E. roasting the gingko leaf powder.

2. A process for preparing a gingko leaf powder tea according to claim 1, further comprising a step of removing gingko leaf powder particles having a particle size smaller than about 400 mesh after roasting the gingko leaf powder.

3. A process for preparing a gingko leaf powder tea according to claim 1, wherein the fresh gingko leaves are roasted at a temperature in a range between about 160° to 180° C.

4. A process for preparing a gingko leaf powder tea according to claim 3, wherein the fresh gingko leaves are roasted for about 10 to 15 minutes.

5. A process for preparing a gingko leaf powder tea according to claim 1, wherein the roasted gingko leaves are rolled for about 15 to 20 minutes.

6. A process for preparing a gingko leaf powder tea according to claim 1, wherein the rolled gingko leaves are heat-dried in a nitrogen atmosphere at a temperature between about 90° to 100° C.

7. A process for preparing a gingko leaf powder tea according to claim 6, wherein the rolled gingko leaves are heat-dried for about 30 to 40 minutes.

8. A process for preparing a gingko leaf powder tea according to claim 1, wherein the heat-dried gingko leaves are shredded and pulverized to a powder having a particle size of about 100 to 400 mesh.

9. A process for preparing a gingko leaf powder tea according to claim 1, wherein the gingko leaf powder is roasted at a temperature between about 80° to 85° C.

10. A process for preparing a gingko leaf powder tea according to claim 9, wherein the gingko leaf powder is agitated while being roasted in a roaster.

11. A process for preparing a gingko leaf powder tea according to claim 9, wherein the gingko leaf powder is roasted for about 2 to 3 hours.

12. A process for preparing a gingko leaf powder tea according to claim 8, further comprising the step of removing gingko leaf powder having a particle size smaller than about 400 mesh.

13. A process for preparing a gingko leaf powder tea according to claim 12, wherein the gingko leaf powder having a particle size smaller than about 400 mesh is removed by fanning the gingko leaf powder.

14. A process for preparing a gingko leaf powder tea according to claim 1, further comprising fermenting the fresh gingko leaves before roasting the leaves.

15. A process for preparing a gingko leaf powder tea according to claim 14, wherein the fresh gingko leaves are fermented in a fermentor at a temperature between about 40° to 50° C.

16. A process for preparing a gingko leaf powder tea according to claim 15, wherein the fresh gingko leaves are fermented in the fermentor for about 60 to 90 minutes.

17. A process for preparing a gingko leaf powder tea according to claim 1, wherein the fresh gingko leaves are roasted at a temperature in a range between about 160° to 180° C. for about 10 to 15 minutes, the roasted gingko leaves are rolled for about 15 to 20 minutes, the rolled gingko leaves are heat-dried in a nitrogen atmosphere at a temperature between about 90° to 100° C. for about 30 to 40 minutes, the heat-dried gingko leaves are shredded and pulverized to a powder having a particle size of about 100 to 400 mesh and thereafter roasted at a temperature between about 80° to 85° C. for about 2 to 3 hours.

\* \* \* \* \*